US010029149B2

(12) United States Patent
Shau

(10) Patent No.: US 10,029,149 B2
(45) Date of Patent: Jul. 24, 2018

(54) SWIMMING GOGGLES

(71) Applicant: David Shau, Palo Alto, CA (US)

(72) Inventor: David Shau, Palo Alto, CA (US)

( * ) Notice: Subject to any disclaimer, the term of this patent is extended or adjusted under 35 U.S.C. 154(b) by 25 days.

(21) Appl. No.: 15/275,583

(22) Filed: Sep. 26, 2016

(65) Prior Publication Data

US 2017/0007889 A1 Jan. 12, 2017

Related U.S. Application Data

(63) Continuation-in-part of application No. 13/569,608, filed on Aug. 8, 2012, now Pat. No. 9,486,671.

(51) Int. Cl.

| | |
|---|---|
| ***G02B 23/16*** | (2006.01) |
| ***A63B 33/00*** | (2006.01) |
| ***H04R 1/02*** | (2006.01) |
| ***H04R 3/00*** | (2006.01) |
| ***G10L 13/02*** | (2013.01) |

(52) U.S. Cl.
CPC ............ *A63B 33/002* (2013.01); *A63B 33/00* (2013.01); *G10L 13/02* (2013.01); *H04R 1/028* (2013.01); *H04R 3/00* (2013.01); *A63B 2033/004* (2013.01); *A63B 2208/03* (2013.01); *A63B 2220/17* (2013.01); *A63B 2220/30* (2013.01); *A63B 2220/40* (2013.01); *A63B 2220/803* (2013.01); *A63B 2220/836* (2013.01); *A63B 2225/12* (2013.01); *A63B 2225/60* (2013.01); *H04R 2430/01* (2013.01)

(58) Field of Classification Search
CPC ... A63B 33/00; A63B 33/002; A63B 2244/20; A61F 9/02; A61F 9/025; G02C 9/02; G02C 5/22; G02C 7/16; G02B 23/16
See application file for complete search history.

(56) References Cited

U.S. PATENT DOCUMENTS

| | | | | |
|---|---|---|---|---|
| 3,944,345 A | | 3/1976 | Decorato | |
| 4,286,340 A | | 9/1981 | Lathrop | |
| 4,298,254 A | * | 11/1981 | Reddick | G02C 9/00 351/50 |
| 5,325,340 A | * | 6/1994 | Ramsey | A63B 71/0686 368/10 |
| 5,561,480 A | * | 10/1996 | Capes | G02C 5/001 351/45 |

(Continued)

FOREIGN PATENT DOCUMENTS

| | | |
|---|---|---|
| CN | 201105124 | 8/2008 |
| FR | 2630653 | 11/1989 |

OTHER PUBLICATIONS

Machine translation of Desbordes, FR 2630653 A1.*
Machine translation of Huang CN 201105124 Y.*

*Primary Examiner* — Bumsuk Won
*Assistant Examiner* — Balram Parbadia

(57) ABSTRACT

Swimming goggles are developed to allow a swimmer to see the end of the pool without moving their head while swimming in backstroke. Using a light reflector, a swimmer can see through a backstroke viewing window, allowing them to see along the direction that they are moving when swimming backstroke. Using a motion sensor and electric control circuits, a swimming goggle can provide optimum views for the swimmer wearing the swimming goggle. Using a sound speaker, a swimming goggle can play music and provide voice reports to the swimmer.

20 Claims, 10 Drawing Sheets

(56) References Cited

U.S. PATENT DOCUMENTS

| | | | | | |
|---|---|---|---|---|---|
| 5,581,822 | A | | 12/1996 | Tagyo | |
| 5,685,722 | A | * | 11/1997 | Taba | A61B 5/222 434/247 |
| 2003/0138763 | A1 | * | 7/2003 | Roncalez | A63B 24/0003 434/254 |
| 2005/0248718 | A1 | * | 11/2005 | Howell | G02C 5/001 351/41 |
| 2006/0010587 | A1 | | 1/2006 | Yokota | |
| 2007/0033717 | A1 | * | 2/2007 | Anderson | B63C 11/12 2/428 |
| 2007/0109491 | A1 | * | 5/2007 | Howell | G02C 11/10 351/41 |
| 2008/0018532 | A1 | * | 1/2008 | Mackintosh | A63B 24/0021 342/357.57 |
| 2010/0030482 | A1 | * | 2/2010 | Li | A61B 5/1112 702/19 |
| 2012/0191408 | A1 | * | 7/2012 | Godin | A61B 5/103 702/150 |
| 2012/0245714 | A1 | * | 9/2012 | Mueller | A63B 71/06 700/91 |

* cited by examiner

FIG. 5(g)

| M1 | M2 | M3 | M4 | Actions |
|---|---|---|---|---|
| 0 | 0 | x | x | Do nothing, power down |
| 0 | 1 | 0 | 0 | Play music |
| 0 | 1 | 0 | 1 | Play music while swimming |
| 0 | 1 | 1 | 0 | Synchronize music pace to swimming pace |
| 0 | 1 | 1 | 1 | Adjust volume according to swimming speed |
| 1 | 0 | 0 | 0 | Lap count |
| 1 | 0 | 0 | 1 | Lap count + lap time |
| 1 | 0 | 1 | 0 | Lap count + lap time + stroke efficiency |
| 1 | 0 | 1 | 1 | Technical feedback |
| 1 | 1 | 0 | 0 | Lap count + music |
| 1 | 1 | 0 | 1 | Lap count + lap time + music |
| 1 | 1 | 1 | 0 | Lap count + lap time + paced music |
| 1 | 1 | 1 | 1 | Lap count + lap time + volume feedback music |

SWIMMING GOGGLES

BACKGROUND OF THE INVENTION

The present invention relates to swimming goggles.

This application is a continuation-in-part application of previous patent application with a Ser. No. 13/569,608, with a title "Swimming Goggles", and filed by David Shau on Aug. 8, 2012.

Swimming is a sport that keeps people in great shape. Swimming exercises most of the body's muscles, and swimming can even save one's life. For most of competitive sports, it is almost guaranteed that people will eventually get hurt by sport injuries. In comparison, swimming is a sport that rarely causes serious injury. However, like me, most swimmers have bumped their head at the end of the pool while swimming backstroke. While at full sprinting speed, this type of injury may even result in minor concussions, and is also quite painful. It is desirable to design swimming goggles that allow swimmers to see the end of the pool without moving their head while swimming in backstroke. Also, backstroke swimmers often swim in a curvy zigzag path in their lane instead of a simple direct straight line. If the swimmer swims in a zigzag path, then the distance that they swim will be longer, and it also makes them look bad. It is desirable for a swimmer to see the sights behind them while swimming backstroke, so that they may line up their position, thus allowing the swimmer to swim in a straight line. It is also desirable to have swimming goggles that can help swimmers maintain proper head position while swimming backstrokes.

Decorato in U.S. Pat. No. 3,944,345 disclosed a swimming goggle equipped with special lens that attaches onto the front of the eye sockets, increasing the user's lateral vision. It, however, does not enable the ability to see behind his or herself, and does not provide wide enough visual range to support backstroke.

Lathrop in U.S. Pat. No. 4,286,340 disclosed a pair of comfortable competition goggles with anti fog washing, watertight fits that enhance the eyesight, and improved forward vision that allows the user to see the wall without lifting their head while swimming the crawl, breast, and butterfly strokes. The swimming goggles, however, does not improve backwards vision, and cannot benefit the ability to see the end of the pool without moving their head while swimming in backstroke.

Tagyo in U.S. Pat. No. 5,581,822 disclosed an attractively shaped pair of goggles that provide watertight vision, and also allow the user to swim faster due to its smooth single large lens. It, however, does not provide the ability to see the wall while swimming backstroke.

Yokota in US Patent Application No. 20060010587 disclosed a pair of goggles that use a contact section that attaches to the area around the eye in the eye socket, therefore, improving the user's field vision. The goggles also prevent light refraction that may cause discomfort to the owner. These goggles may enhance the peripheral vision while swimming backstroke, but it does not give a clear vision of the wall; the swimmers still need to change their normal head positions to see the wall. It also does not use a light reflector.

Desbordes in French patent number FR 2630653 disclosed a swimming goggle that has a backstroke viewing window and a light reflector. The light reflector does not switch position with respect to the front viewing window, and it does not change position depending on the body motions of the swimmer.

Huang in Chinese patent number CN201105124 disclosed a swimming goggle that has a backstroke viewing window and a light reflector. Huang apparatus provides visibility to overhead direction when the swimmer is in position for backstroke, freestyle, and diving in order to avoid colliding with other swimmers in a crowed swimming pool. Huang's apparatus does not address the needs to view different parts of the swimming pool while the swimmer is swimming backstroke versus freestyle.

None of the above prior art swimming goggles comprise electric control mechanisms.

SUMMARY OF THE PREFERRED EMBODIMENTS

A primary objective of the preferred embodiments is, therefore, to provide swimming goggles that allow the user to see behind him or her without changing their normal head position while swimming backstroke. This will reduce the chance of injury, since they can now see where the wall is. Another objective is to prevent the swimmer from swimming in a zigzag manner when they swim across the pool in their lane. This will allow the swimmer to go faster, and prevent the user from crashing into the lane lines. Another primary objective is to provide sophisticated motion related information to a swimmer while the swimmer is swimming. These and other objectives are assisted by providing swimming goggles with backstroke viewing windows at the eye sockets, as well as an integrated circuit attached to the goggle.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1(*b*) shows the swimming goggle in FIG. 1(*a*) while the light blocking cover of the backstroke viewing window is closed;

FIG. 1(*c*) shows a goggle without a light blocking cover on the backstroke viewing window;

FIG. 1(*d*) shows a goggle with backstroke viewing windows on both eye sockets;

FIG. 3(*b*) shows a simplified view of a user who is swimming backstroke on his back;

FIG. 5(*b*) shows a close up of the electric controller in FIG. 5(*a*);

FIG. 5(*c*) is a symbolic block diagram for the electric controller and output devices in FIG. 5(*b*);

FIG. 5(*d*) is a symbolic block diagram illustrating how procedures are executed to determine the actions of a swimmer wearing a swimming goggle equipped with the electric controller in FIG. 5(*c*);

FIG. 5(*e*) is a flowchart for an exemplary application program used by the electric controller in FIG. 5(*c*);

FIG. 5(*f*) is a flowchart for another exemplary application program used by the electric controller in FIG. 5(*c*); and FIG. 5(*g*) shows a table that lists exemplary modes supported by the electric controller in FIG. 5(*c*).

DETAILED DESCRIPTION OF THE PREFERRED EMBODIMENTS

Figure 1A:
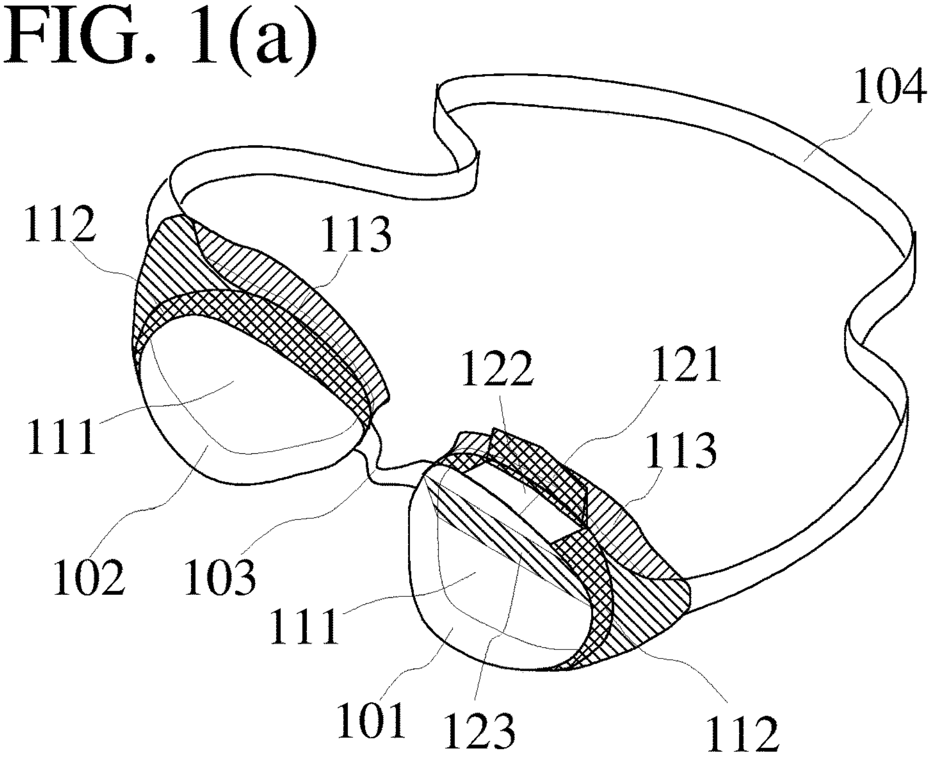
FIG. 1(*a*) shows one example of the swimming goggles of the present invention that has a backstroke viewing window on one eye socket.
Figure 1B:
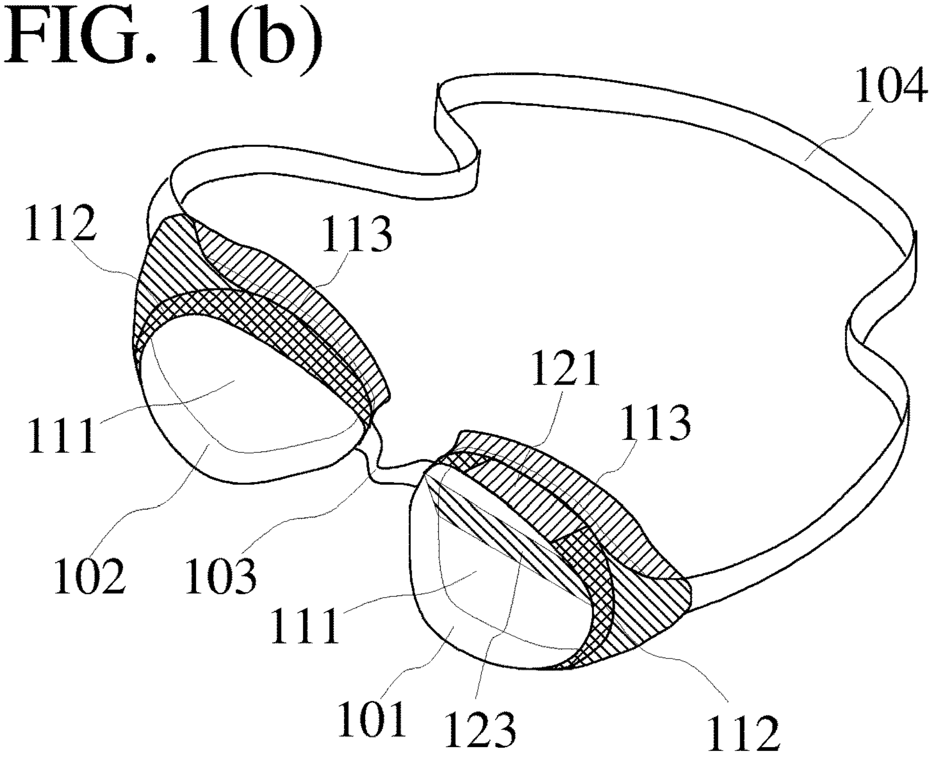
Figure 1C:
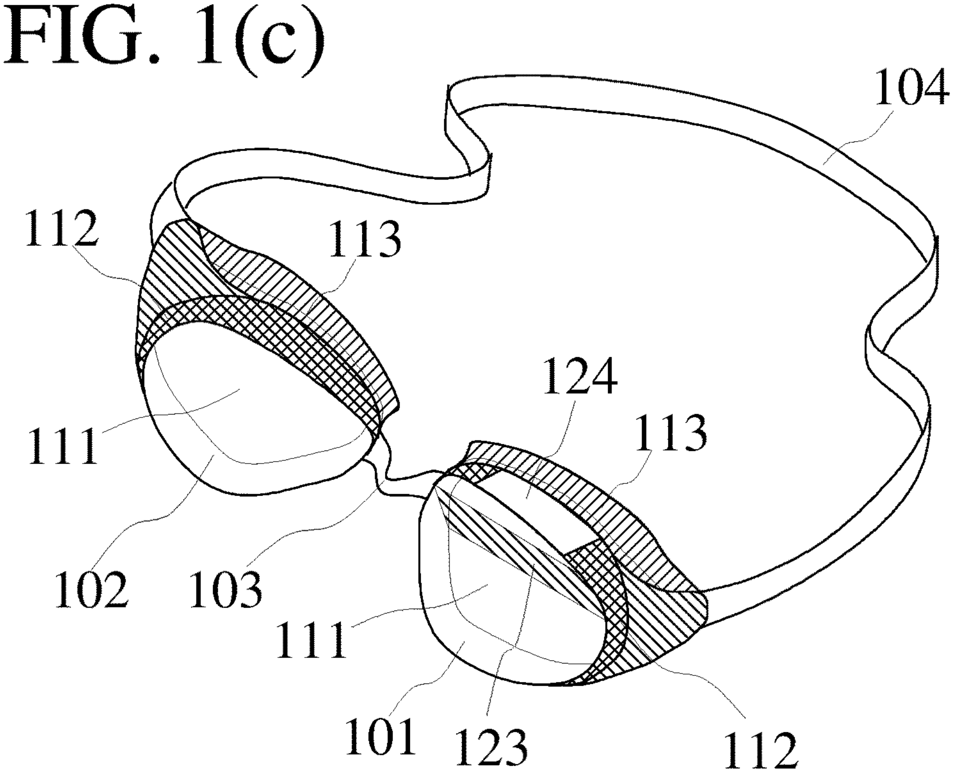
Figure 1D:
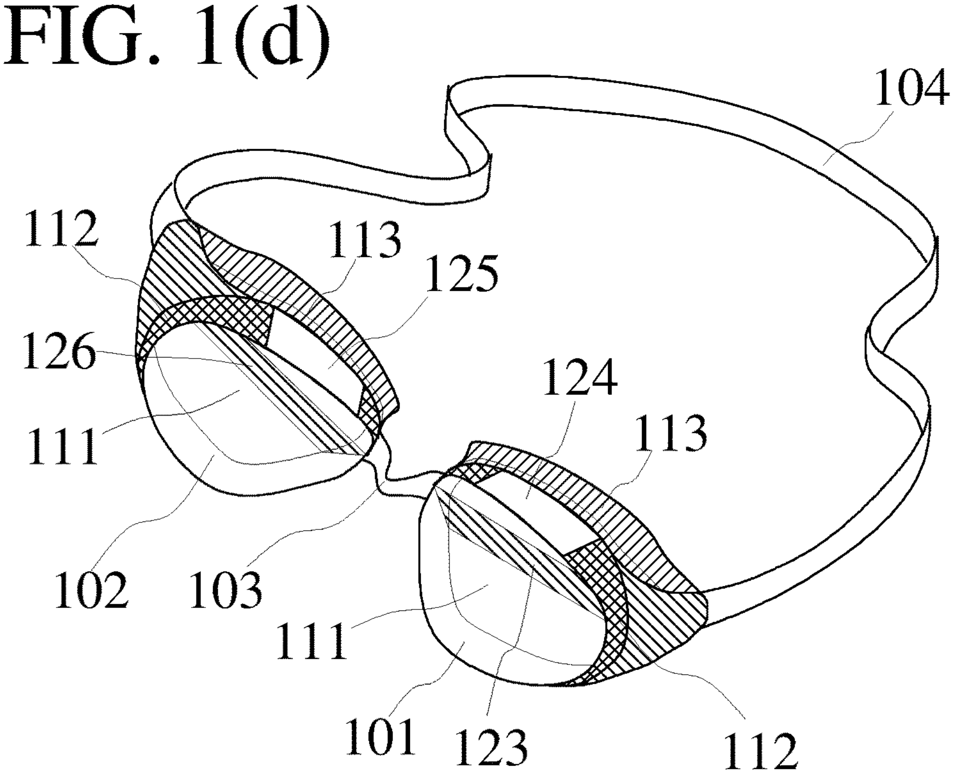

FIGS. 1(*a-d*) show examples of the goggles of the present invention. The goggles in these examples comprise two eye sockets (101,102) connected by a nosepiece (103) and a head strap (104). Each eye socket (101,102) has a forward viewing window (111) that is mounted on a suction socket (113). Typically, the forward viewing window (111) is made of transparent plastic plate, and the suction socket (113) is made of rubber or plastic. The suction socket (113) sticks onto swimmer's eyes, creating a water tight seal while providing a space between the eye and the forward viewing window (113), allowing clear under-water vision. These structures are similar to those used in conventional swimming goggles. In addition, the examples in FIGS. 1(*a-d*) contain structures that are designed to allow the swimmer to see the end of the pool without moving their head while swimming in backstroke. For example, FIGS. 1(*a, b*) illustrate a goggle that has a backstroke viewing window (122) opened at the upper side (112) of the eye socket. A backstroke viewing window, by definition, is a transparent window on the eye socket of a swimming goggle that faces upward direction while the swimmer wearing the goggle is standing upright so that it faces the end of swimming pool when the swimmer is in normal head position while swimming backstroke. A backstroke viewing window is typically nearly vertical to the front viewing window. In this example, the backstroke viewing window (122) is made of transparent plastic. To prevent unwanted peripheral lights, the backstroke viewing window (122) can be covered with a light blocking cover (121). FIG. 1(*a*) illustrates the situation when the light blocking cover (121) of the backstroke viewing window (122) is opened, and FIG. 1(*b*) illustrates the situation when the light blocking cover (121) is closed. In this example, a light reflector (123) is placed inside the eye socket (101), as illustrated in FIGS. 1(*a, b*). In this example, the light reflector (123) is a transparent plastic plate supporting the functions of a half-mirror. A half-mirror, by definition, is a light reflector that is partially transparent and partially reflecting. In this example, the index of reflection of the light reflector (123) is adjusted in such way that the reflected view is more dominating than the transparent view. When the light blocking cover (121) of the backstroke viewing window (122) is opened, as shown in FIG. 1(*a*), the light that travels through the backstroke viewing window (122) is reflected by the light reflector (123), allowing the swimmer to see the end of the pool without moving head while swimming in backstroke. When the light blocking cover (121) of the backstroke viewing window (122) is closed, as shown in FIG. 1(*b*), almost no light would come from the upward direction so that the swimmer would see views at the front direction through the half-mirror light reflector (123).

While the preferred embodiments have been illustrated and described herein, other modifications and changes will be evident to those skilled in the art. For example, the light reflector (123) can be a mirror instead of a half-mirror. For another example, FIG. 1(*c*) shows another goggle that has a backstroke viewing window (124) without a light blocking cover. This goggle can be manufactured at lower cost, but users may see unwanted lights from upward direction. Another example in FIG. 1(*d*) shows a goggle with backstroke viewing windows (124, 125) and light reflectors (123, 126) in both eye sockets (101,102). This goggle allows better upward vision because both eyes are now able to see the same reflection, but front view will be less clear. It is to be understood that there are many other possible modifications and implementations so that the scope of the invention is not limited by the specific embodiments discussed herein.

Figure 2A:
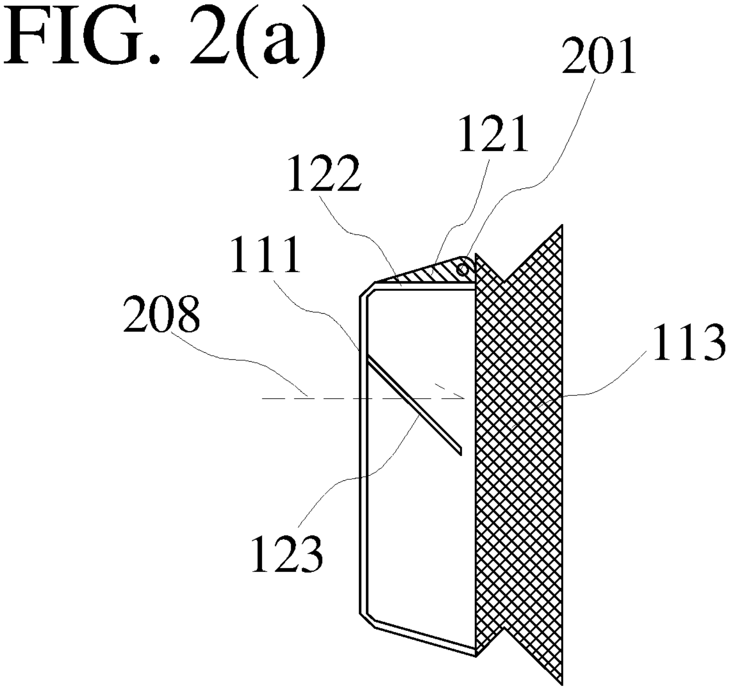
FIG. 2(*a, b*) are cross-section views of an eye socket that can automatically switch the position of the light blocking cover of the backstroke viewing window.
Figure 2B:
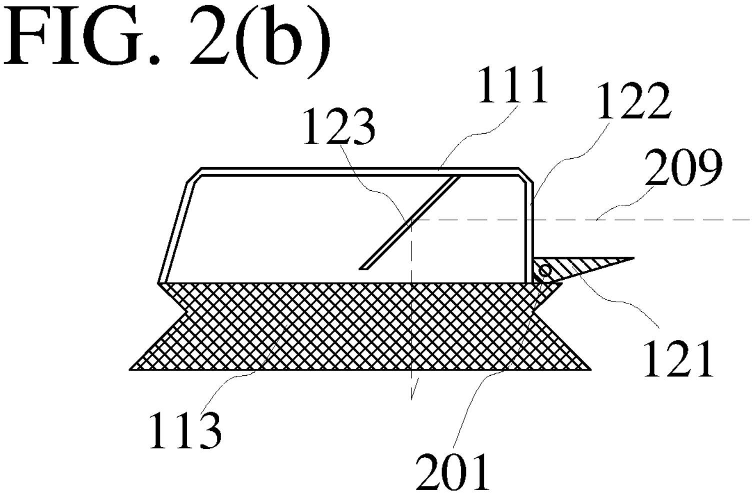
Figure 3A:
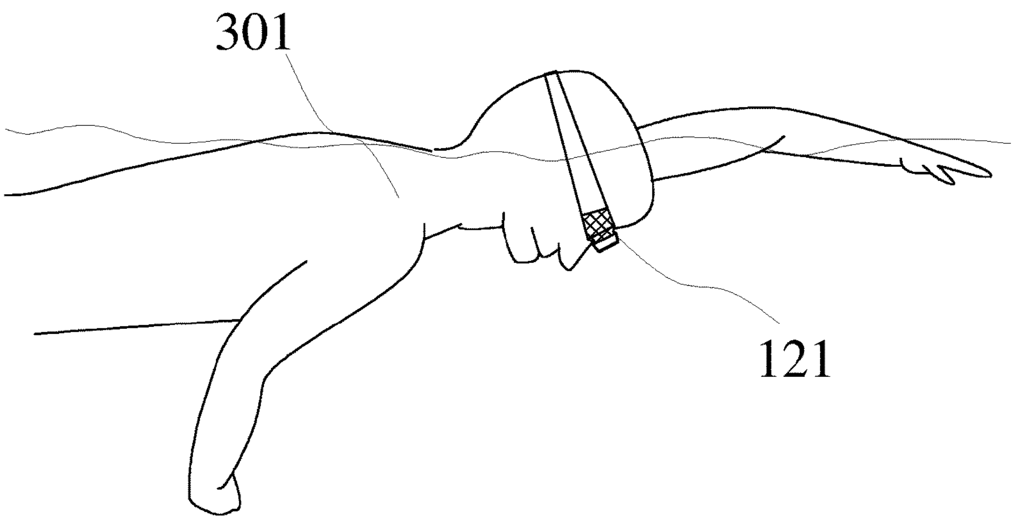
FIG. 3(*a*) shows a simplified view of a user who is swimming freestyle on his front.
Figure 3B:
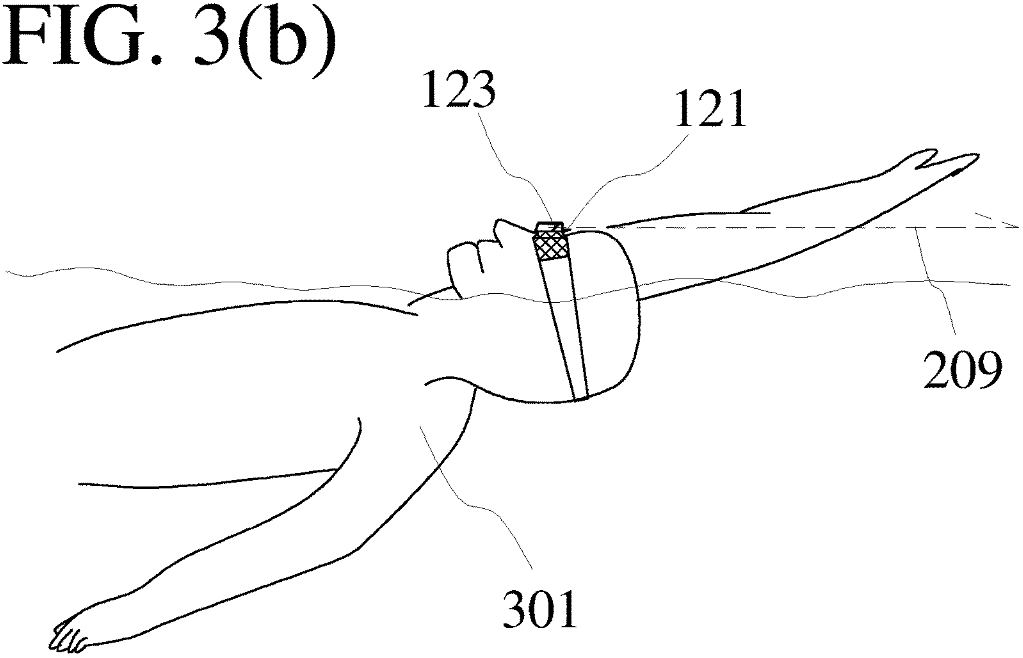

The light blocking cover (121) of the backstroke viewing window (122) shown in FIGS. 1(*a, b*) may be opened or closed manually. A swimmer can open the light blocking cover while swimming backstroke, and close it while swimming other strokes. While swimming melody, a swimmer needs to swim backstroke and other strokes. Flipping the light block cover while swimming can be troublesome. It is desirable to open or close the light blocking cover (121) automatically according to the stroke the swimmer is swimming. FIGS. 2(*a-b*) show cross-section views of an eye socket that can open or close the light blocking cover (121) automatically. In this example, the light blocking cover (121) is designed to rotate around a rotation axis (201). When the socket is at a position as illustrated in FIG. 2(*a*), the light blocking cover (121) is closed due to gravity. Under this situation, the light (208) passes directly through the half mirror (123) allowing the user to see what they would normally see while facing forward. Due to gravity, the light blocking cover (121) is also closed when the eye socket is facing downward. FIG. 3(*a*) illustrates the situation when a swimmer (301) wearing the goggle is swimming freestyle. Under this situation, the light blocking cover (121) of the backstroke viewing window is closed so that the swimming goggle functions as a conventional goggle. While swimming backstroke, the eye socket would face upward as illustrated by FIG. 3(*b*) and by the cross section diagram in FIG. 2(*b*). At this position, the light blocking cover (121) would rotate backward along the rotation axis (201) by gravity, opening the backstroke viewing window (122) as illustrated in FIG. 2(*b*). The light (209) through the opened window (122) is reflected by the light reflector (123), allowing the swimmer (301) to see the end of the pool without moving his head while swimming in backstroke.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, the light reflector also can be automatically switched into position as shown by the cross-section diagrams in FIGS. 4(*a-b*).

Figure 4A:
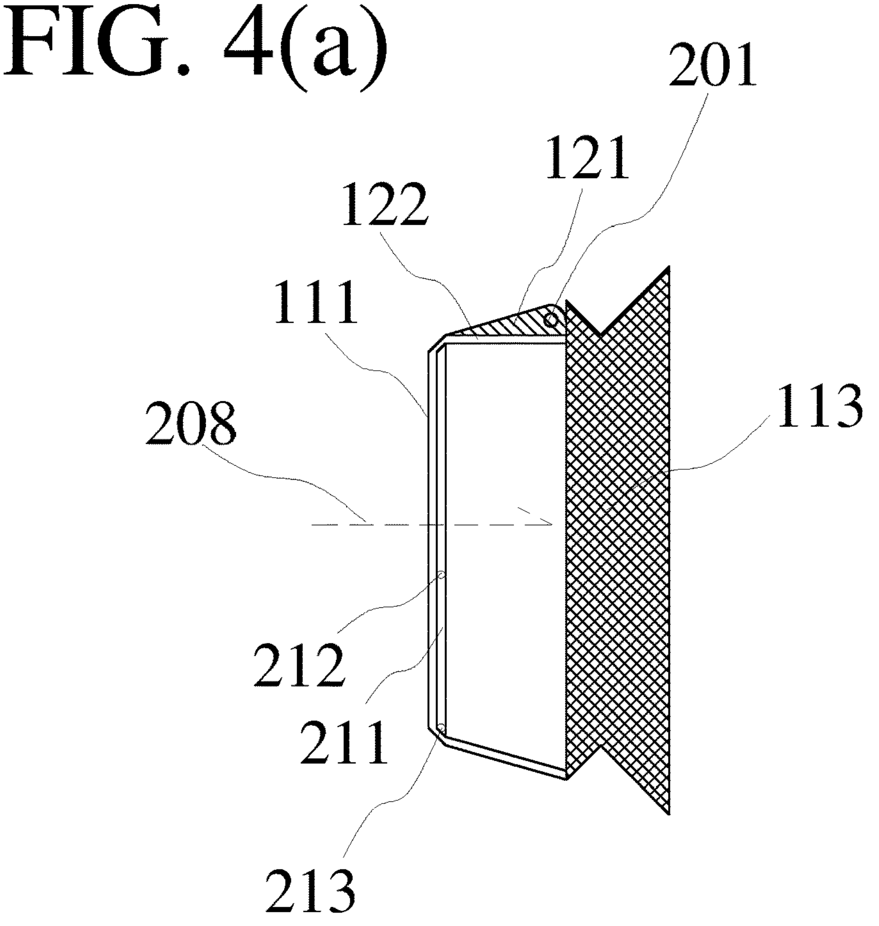
FIG. 4(*a, b*) are cross-section views of an eye socket that can automatically switch the positions of the light blocking cover and the light reflector.
Figure 4B:
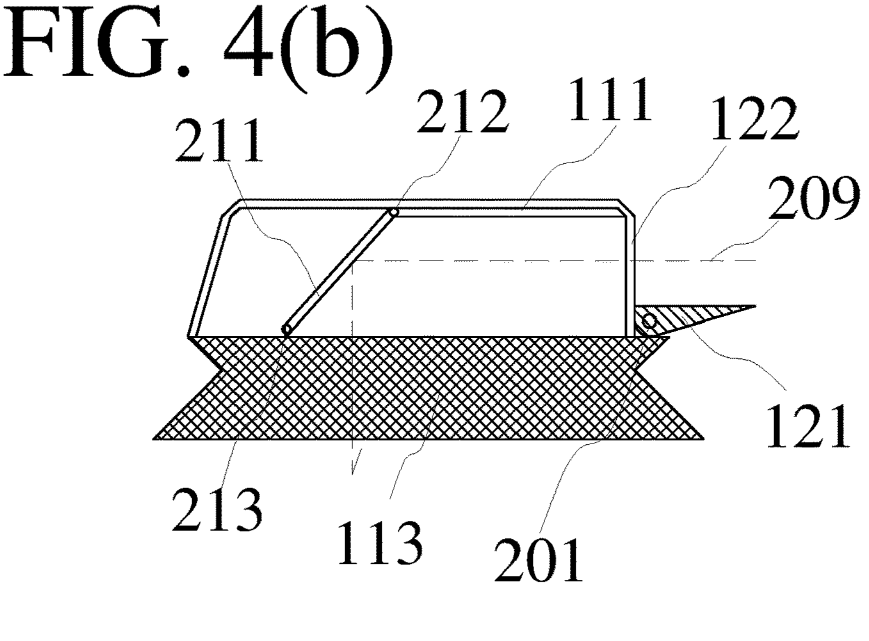
Figure 5A:
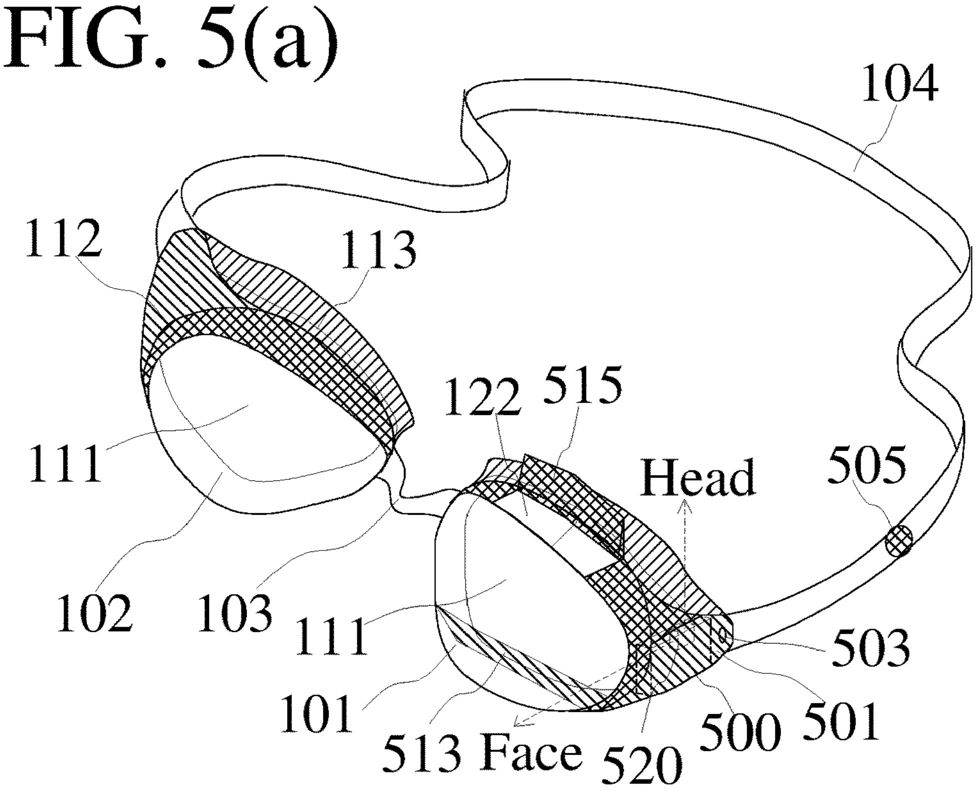
FIG. 5(*a*) shows a swimming goggle that has an electric controller (500) and an electric sound speaker (505)
Figure 5B:
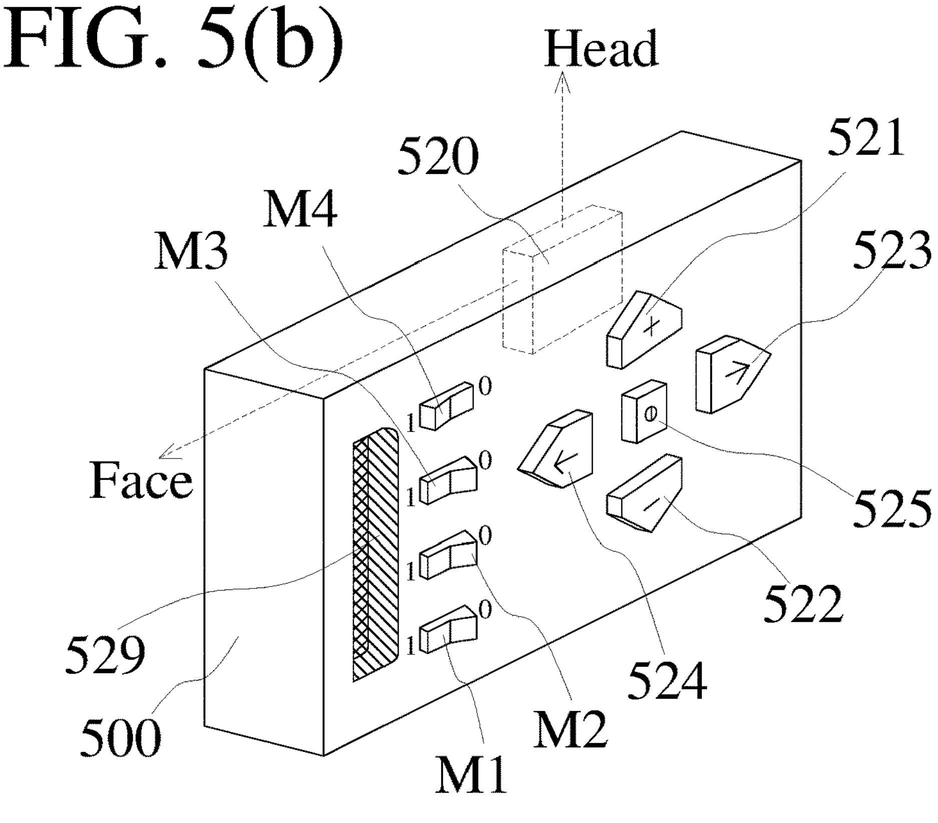
Figure 5C:
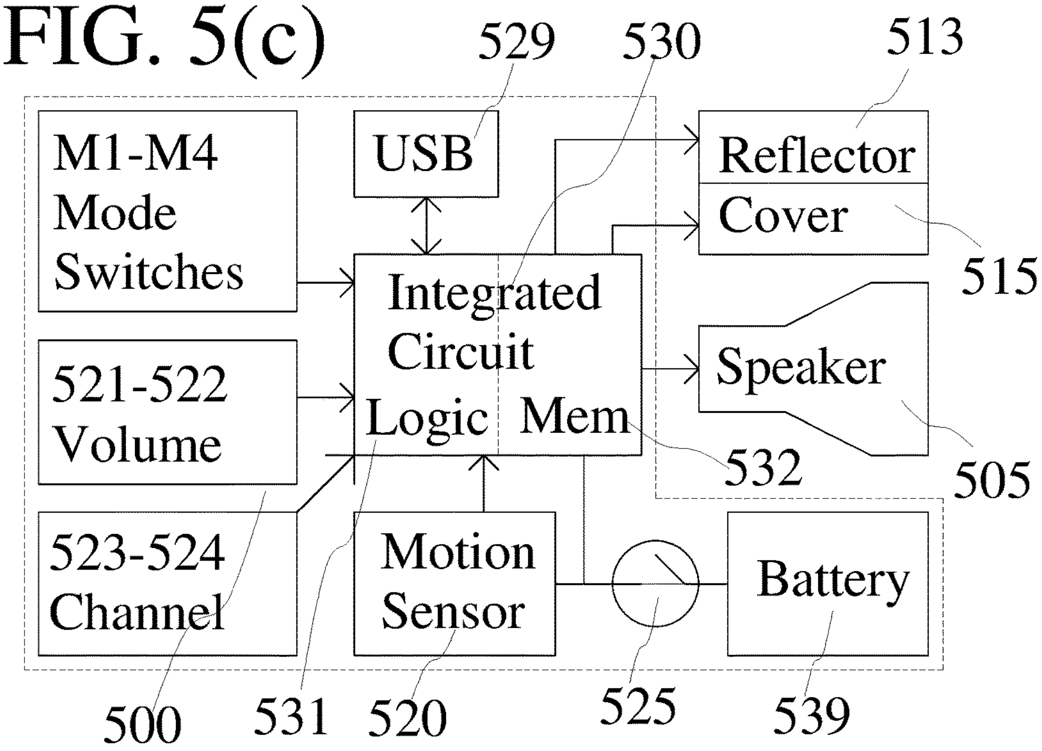
Figure 5D:
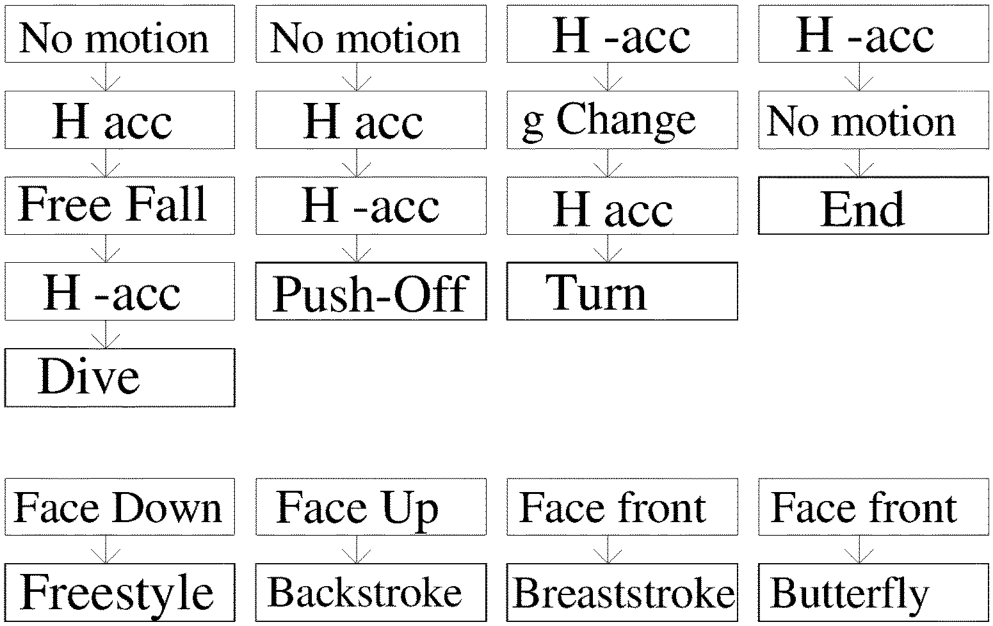
Figure 5E:
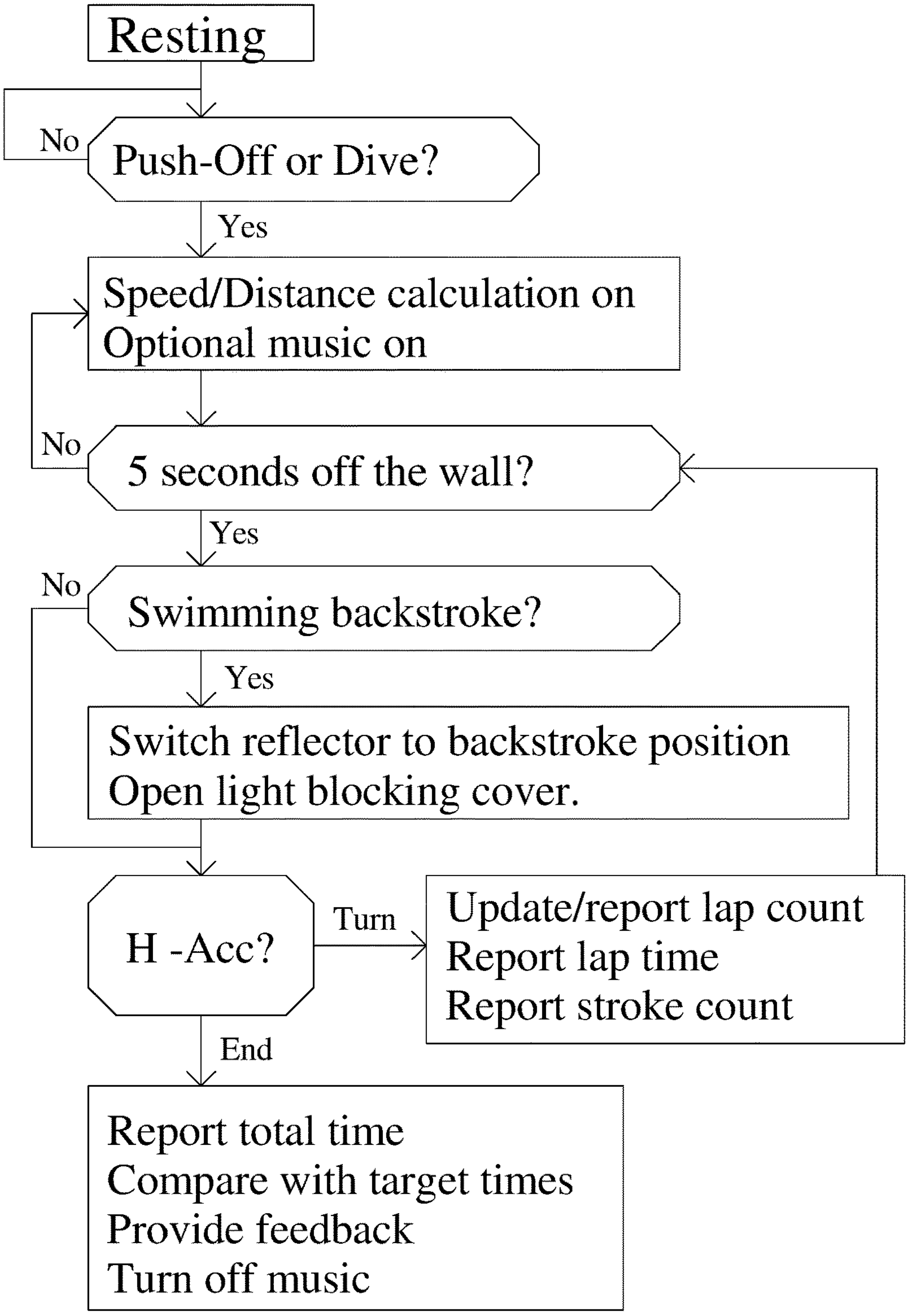
Figure 5F:
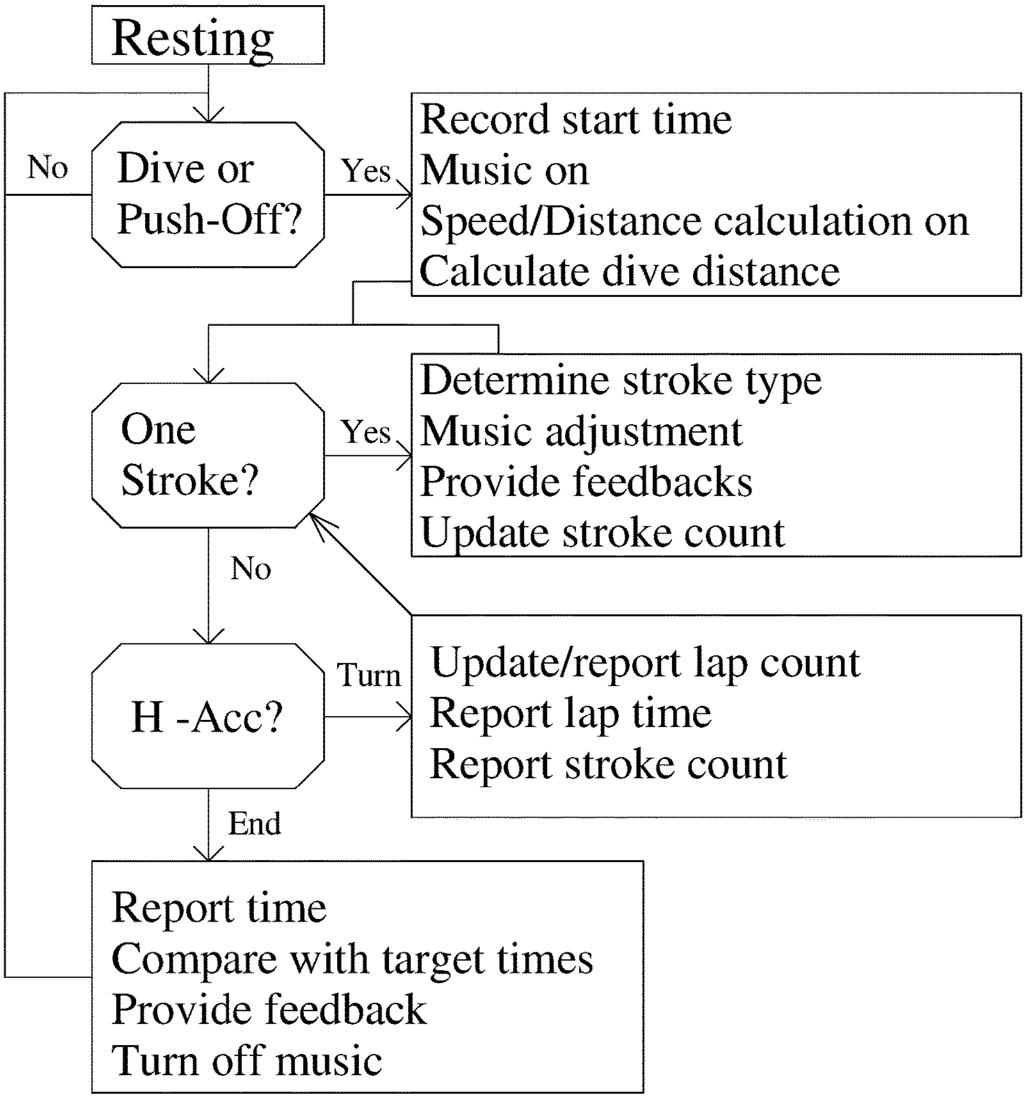

The eye socket shown in FIGS. 4(*a-b*) is similar to the eye socket shown in FIGS. 2(*a, b*) except that it has a light reflector (211) that can rotate against a rotation axis (212). A weight (213) is placed near the end of the light reflector (211) so that its position can be switched by gravity. When the socket is at a position illustrated in FIG. 4(*a*), the light reflector (211) is pulled by gravity to be in contact with the front viewing window (111) and functions as part of the front viewing window. Under this situation, the eye socket behaves as a conventional eye socket. Due to gravity, the position of this light reflector (211) would remain the same while the swimmer is swimming freestyle, breast, or butterfly strokes. While swimming backstroke, the eye socket would face upward, and the light reflector (211) would fall down due to gravity, as shown in FIG. 4(*b*). The light (209) through the opened backstroke viewing window (122) is reflected by the light reflector (211), allowing the swimmer to see the end of the pool without moving their head while swimming in backstroke.

The preferred embodiments of the present invention provide swimming goggles that allow the user to see the end of swimming pool without changing normal head position while swimming backstroke. The chance of injury is reduced because backstroke swimmers can now see where the wall is. The backstroke swimmer also can adjust swimming direction by vision to swim in straight line to achieve better time. These and other objectives are achieved by opening backstroke viewing windows at the eye sockets of swimming goggles. A light blocking cover can be used to prevent unwanted light going through the backstroke viewing window. The light blocking cover can be operated manually or automatically. A light reflector is typically used with the backstroke viewing window. This light reflector can be a half mirror or a full mirror. The light reflector also can be designed to change position automatically according the stroke the swimmer is swimming.

While the preferred embodiments have been illustrated and described herein, other modifications and changes will be evident to those skilled in the art. It is to be understood that there are many other possible modifications and implementations so that the scope of the invention is not limited by the specific embodiments discussed herein. While the examples in FIG. 4(*a, b*) automatically switch the position of the light blocking cover and the light reflector by gravity, we can also use the buoyant force of water, the body motions of the swimmer, and other methods to switch the positions of the light blocking cover or the light reflector. FIGS. 5(*a*-*g*) show an exemplary swimming goggle that switches the position of the light blocking cover and the position of the light reflector by an electric controller.

FIG. 5(*a*) shows a swimming goggle that has the same structures as those of the swimming goggle in FIG. 1(*a*) except that the swimming goggle in FIG. 5(*a*) has an electric sound speaker (505) attached to its head strap (104), and an electric controller (500). This electric controller (500) is able to control the position of a light reflector (513) and the position of a light blocking cover (515). The electric controller (500) is covered by a water-tight cover (501) when the goggle is used in water. A button (503) on the water-tight cover (501) allows the user to open the cover in order to adjust operation modes of the electric controller (500). A motion sensor (520) is placed inside of the electric controller (500). This motion sensor (520) is attached to the swimming goggle at a fixed position with respect to the forward viewing window (111), and outputs electric signals that are related to the motions of the swimmer wearing the swimming goggle. One example of a motion sensor that can be used for this purpose is the LIS332AR motion sensor made by STMicroelectronics. LIS332AR is an accelerometer that measures a three-dimensional acceleration vector, and outputs three voltages, which are proportional to the three components of the acceleration vector along its x, y, and z directions. For the example in FIGS. 5(*a*-*g*), the motion sensor (520) can be an LIS332AR accelerometer that is placed at a position where its x axis is pointing towards the viewing direction through the forward viewing window (111), as illustrated by the dashed lined arrows in FIGS. 5(*a, b*). This direction will be called the "Face direction" in the following discussions. The y axis of the motion sensor (520) is pointing towards the viewing direction through the backstroke viewing window (122), as illustrated by the dashed lined arrows in FIGS. 5(*a, b*). This direction will be called the "Head direction" in the following discussions. For this example, the electric sound speaker (505) is attached to the head strap (104) of the swimming goggle in FIG. 5(*a*). The electric sound speaker (505) also can be an earbud or a speaker in other shapes.

A user can open the water-tight cover (501) on the swimming goggle to reach the front panel of the electric controller (500). As shown in FIG. 5(*b*), the front panel of the electric controller (500) comprises a USB interface socket (529), four mode-select switches (M1-M4), two volume control switches (521-522), two channel-select switches (523, 524), and a power switch (525). All the other electric components of the electric controller (500) are sealed in water-proof packages so that they are not visible in FIG. 5(*b*). The motion sensor (520) is drawn in dashed lines in FIG. 5(*b*) with dashed lined arrows pointing to the head direction and the face direction. FIG. 5(*c*) is a block diagram that shows the components of the electric controller (500). The intelligence of the electric controller (500) is provided by an integrated circuit (530). In this example, the integrated circuit (530) comprises a memory module (532) and a logic module (531). One example of the logic module is a programmable microcontroller. One example of the memory module is a FLASH nonvolatile memory device. The memory module (532) and the logic module (531) can be one integrated circuit chip in the same package, and can also be separated integrated circuit chips in separated packages. In this example, the integrated circuit is programmable through the Universal Serial Bus (USB) interface (529) shown in FIGS. 5(*b, c*). A computer or a mobile electric device can be used to program the integrated circuit (530) using the USB interface (520). The power lines of the USB interface are connected to a rechargeable battery (539). The electric connection between the rechargeable battery (539) and the integrated circuit (530) is controlled by a power switch (525). This power switch (525) is a toggle switch on the front panel of the electric controller (500), as shown in FIG. 5(*b*). The mode-select switches (M1-M4) determine the operation mode of the integrated circuit (530); an exemplary list of operation modes is shown in FIG. 5(*g*). The volume control switches (521, 522) control the volume of the speaker (505). The channel-select switches (523, 524) can be used to select music to be played by the speaker (505).

The logic module (531) of the integrated circuit (530) is able to analyze the outputs of the motion sensor (520) to determine the outputs of the integrated circuit (530), while the swimmer wearing the swimming goggle is swimming in water. The integrated circuit (530) is able to control the position of the reflector (51 3) and the light blocking cover (51 5) based on the motions of the swimmer detected by the motion sensor (520). The integrated circuit is also able to control the outputs of the electric sound speaker (505) while the swimmer wearing the swimming goggle is swimming in water.

FIG. 5(*d*) is a simplified symbolic float chart for the sequences of events used to determine the actions of the swimmer using the outputs of the motion sensor (520). In FIGS. 5(*d*-*g*), the symbol "H acc" means the motion sensor detected a large acceleration in the head direction, and the symbol "H-acc" means the motion sensor detected a large negative acceleration in the head direction. For example, if the motion sensor (520) detects no motion initially, followed by a large acceleration in head direction (H acc), followed by a free fall, and ending with a large negative acceleration in head direction (H-acc), then the logic module (531) of the integrated circuit (530) would know that the swimmer just dived into water. This process is shown in the first column of FIG. 5(*d*). If the motion sensor (520) detects no motion initially, followed by a large acceleration in head direction (H acc), and ending with a large negative acceleration in head direction (H-acc) without a free fall in between, then the logic module (531) of the integrated circuit (530) would know that the swimmer just pushed off the wall of a swimming pool. This process is shown in the second column of FIG. 5(*d*). If the motion sensor (520) detects a large negative acceleration in head direction (H-acc), followed by a change in direction of the gravity g force relative to the orientation of the motion sensor (520), and ending with a large acceleration in head direction (H acc), then the logic module (531) of the integrated circuit (530) would know that the swimmer just performed a flip turn. This process is shown in the third column of FIG. 5(*d*). If the motion sensor (520) detects a large negative acceleration in head direction (H-acc), which ended with no motion, then the logic module (531) of the integrated circuit (530) would know that the swimmer just finished swimming. This process is shown in the fourth column of FIG. 5(*d*). The motion sensor (520) also can tell the integrated circuit (530) the angle between gravity (g) relative to the face direction. When the swimming is swimming face down, the integrated circuit (530) would know that the swimmer is swimming freestyle; when the swimming is swimming face up, the integrated circuit (530) would know that the swimmer is swimming backstroke; and when the swimming is swimming face front for a period of time during each stroke, the integrated circuit (530) would know that the swimmer is swimming either breaststroke or butterfly, which can be distinguished by detailed analysis, as shown by the examples in FIG. 5(*d*).

Using the procedures in FIG. 5(*d*) to determine the actions of the swimmer, application programs stored in the non-volatile memory (532) of the integrated circuit (530) in the electric controller (500) can support sophisticated control of the light reflector (513), the light blocking cover (51 5), and the electric sound speaker (505). FIG. 5(*e*) is a flowchart for an exemplary application program used by the electric controller in FIG. 5(*c*). When a dive or push-off is detected after a resting state, the integrated circuit (530) starts to execute speed and distance calculations. If the motion sensor (520) is an accelerometer, speed can be calculated by integration of acceleration along head direction, and distance can be calculated by integration of speed. Using the electric sound speaker (505), the integrated circuit (530) also can play music that is stored in integrated circuit memory device (532). Furthermore, the integrated circuit (530) would measure time using an internal timer, wait for 5 seconds, and check if the swimmer is swimming in backstroke or not by detecting face direction of the swimmer. If the swimmer is swimming backstroke, the integrated circuit (530) switches the light reflector (513) to backstroke position, and opens the light blocking cover (515) so that the swimmer can view the end of the swimming pool. The integrated circuit can also lap count. After the motion sensor (520) detects a large negative acceleration in the head direction (H-Acc), the integrated circuit (530) analyzes the next action of the swimmer. If the swimmer makes a turn, then the integrated circuit (530) updates the lap count, and reports the lap count to the swimmer using the electric sound speaker (505); optionally, the lap time and stroke count of the swimmer also can be reported to the swimmer at this time. If the swimmer stops swimming, then the integrated circuit (530) reports the total time to the swimmer using the electric sound speaker (505); optionally, the total time can be compared with target times, and the integrated circuit (530) can provide feedback such as encouraging words using the electric sound speaker (505); music also can be turned off at this time.

FIG. 5(*f*) is a flowchart for another exemplary application program used by the electric controller in FIG. 5(*c*). In this example, when a push-off or a dive is detected after resting state, the integrated circuit (530) starts time measurement, turns on music, and starts speed and distance calculations. It also can measure dive distance. After the swimmer takes a stroke, the integrated circuit (530) determines the stroke type and updates the stroke count. Feedback can be provided using voice through the electric sound speaker (505). After the motion sensor (520) detects a large negative acceleration in the head direction (H-Acc), the integrated circuit (530) analyzes the next action of the swimmer. If the swimmer makes a turn, then the integrated circuit (530) will update the lap count, and report the lap count to the swimmer using the electric sound speaker (505); optionally, the lap time and stroke count of the swimmer also can be reported at this time. If the swimmer stops swimming, then the integrated circuit (530) reports the total time to the swimmer using the electric sound speaker (505); optionally, the total time can be compared with target times, and the integrated circuit (530) can provide feedback such as encouraging words using the electric sound speaker (505).

While the preferred embodiments have been illustrated and described herein, other modifications and changes will be evident to those skilled in the art. It is to be understood that there are many other possible modifications and implementations so that the scope of the invention is not limited by the specific embodiments discussed herein. Using a programmable integrated circuit, a swimming goggle equipped with an electric controller is capable of performing wide varieties of functions to support a swimmer wearing the swimming goggle. FIG. 5(*g*) shows a table that lists exemplary modes supported by the electric controller in FIG. 5(*c*). For example, when the mode-select switches (M1-M4) are set to be (0, 1, 0, 0), the electric sound speaker (505) is enabled to play music. The electric sound speaker (505) is able to change the way to play music depending on the motions of the swimmer wearing the swimming goggle. For example, when the mode-select switches (M1-M4) are set to be (0,1,1,0), the electric sound speaker (505) plays music with a pace that is synchronized with the swimming pace of the swimmer; when the mode-select switches (M1-M4) are set to be (0,1,1,1), the integrated circuit (630) adjusts the volume of the music played by the electric sound speaker (505) according to the swimming speed of the swimmer. The electric sound speaker of the swimming goggle is able to play music at a beat or a volume that is related to the motions of the swimmer wearing the swimming goggle. More examples are listed in FIG. 5(*g*).

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A swimming goggle comprising:

an eye socket having a transparent forward viewing window attached to a goggle frame;

an accelerometer that is attached to the swimming goggle at a fixed position with respect to the forward viewing window of said eye socket in an orientation such that one measurement axis of the accelerometer is pointing towards the viewing direction through the forward viewing window of the swimming goggle, wherein the accelerometer outputs electric signals related to the swimming strokes of the swimmer wearing the swimming goggle; and an integrated circuit that is able to use the outputs of said accelerometer to measure the angle between the gravity acceleration vector (g) and the viewing direction through the forward viewing window, and determine whether or not the swimmer wearing the swimming goggle is swimming backstroke while the swimmer wearing the swimming goggle is swimming in water; when the viewing direction through the forward viewing window points up, meaning that the viewing direction through the forward viewing window is opposite of the direction of the gravity acceleration vector (g), the swimmer is swimming backstroke; otherwise, the swimmer is not swimming backstroke.

2. The eye socket of the swimming goggle in claim 1 further comprises:

a backstroke viewing window opened on a top portion of the goggle frame disposed away from the transparent forward viewing window; and a position-switchable light blocking cover attached to an edge of the backstroke viewing window that can switch positions with respect to the edge of the backstroke viewing window;

where the position of the position-switchable light blocking cover is controlled electronically by the integrated circuit in a way such that said position-switchable light blocking cover is open only when the swimmer wearing the swimming goggle is swimming backstroke.

3. The swimming goggle in claim 1 further comprises a position-switchable light reflector that can switch positions with respect to the front viewing window of the eye socket, and the position of said position-switchable light reflector is controlled electronically by the integrated circuit in the swimming goggle so that said position-switchable light reflector switches positions based on whether or not the swimmer wearing the swimming goggle is swimming backstroke.

4. The accelerometer of the swimming goggle in claim 1 is placed in an orientation such that one measurement axis of the accelerometer is pointing towards the viewing direction through the backstroke viewing window.

5. The swimming goggle in claim 1 wherein the integrated circuit uses the outputs of the accelerometer to determine the swimming speed of the swimmer wearing the swimming goggle.

6. The swimming goggle in claim 1 wherein the integrated circuit uses the outputs of the accelerometer to determine the number of laps the swimmer wearing the swimming goggle has swum.

7. The swimming goggle in claim 1 wherein the integrated circuit uses the outputs of the accelerometer to determine the stroke of the swimmer wearing the swimming goggle; when the viewing direction through the forward viewing window points up, the swimmer is swimming backstroke; when the viewing direction through the forward viewing window continually points down, the swimmer is likely swimming freestyle; when the viewing direction through the forward viewing window points forward for a brief period of time during each stroke, the swimmer is swimming either breaststroke or butterfly.

8. The swimming goggle in claim 1 comprises a battery.

9. The integrated circuit of the swimming goggle in claim 1 comprises a nonvolatile memory device.

10. The integrated circuit of the swimming goggle in claim 1 is programmable by a computer or a mobile electric device.

11. The swimming goggle in claim 1 further comprises:

an electric sound speaker attached to said swimming goggle;

wherein said swimming goggle is able to control the outputs of said electric sound speaker while the swimmer wearing the swimming goggle is swimming in water.

12. The electric sound speaker of the swimming goggle in claim 11 is able to play music while the swimmer wearing the swimming goggle is swimming in water.

13. The electric sound speaker of the swimming goggle in claim 12 is able to change how the music is played based on the motions of the swimmer wearing the swimming goggle.

14. The electric sound speaker of the swimming goggle in claim 13 is able to play music at a beat that is related to the motions of the swimmer wearing the swimming goggle.

15. The electric sound speaker of the swimming goggle in claim 13 is able to play music at a volume that is related to the motions of the swimmer wearing the swimming goggle.

16. The electric sound speaker of the swimming goggle in claim 11 provides a voice that can report the swimming speed of the swimmer wearing the swimming goggle.

17. The electric sound speaker of the swimming goggle in claim 11 provides a voice that can report the number of laps the swimmer wearing the swimming goggle has swum.

18. The electric sound speaker of the swimming goggle in claim 11 provides a voice that can report the time that the swimmer wearing the swimming goggle has swum.

19. The integrated circuit of the swimming goggle in claim 11 comprises a nonvolatile memory device.

20. The integrated circuit of the swimming goggle in claim 11 is programmable by a computer or a mobile electric device.

* * * * *